July 25, 1967 C. L. LOVERCHECK 3,332,404
DUAL ENGINE

Filed Feb. 15, 1965 4 Sheets-Sheet 1

INVENTOR.
CHARLES L. LOVERCHECK

*INVENTOR.*
CHARLES L. LOVERCHECK

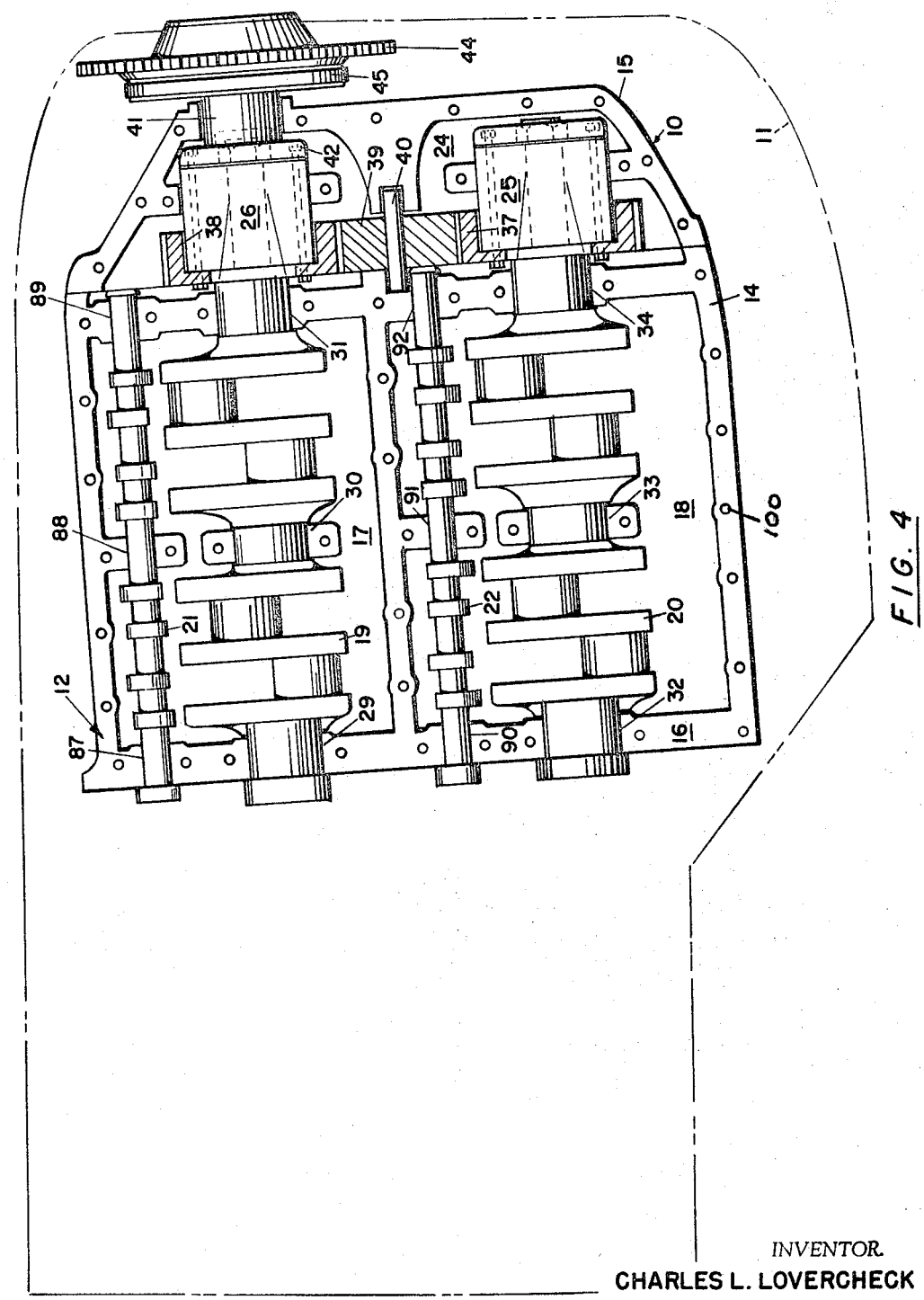

United States Patent Office 3,332,404
Patented July 25, 1967

3,332,404
DUAL ENGINE
Charles L. Lovercheck, 1315 G. Daniel Baldwin Bldg., Erie, Pa. 16501
Filed Feb. 15, 1965, Ser. No. 432,543
9 Claims. (Cl. 123—52)

This invention relates to aircraft engines and, more particularly, to a dual type of engine wherein the engine contains two individual operating units, either of which can operate independent of the other.

In aviation, there are two general types of fixed winged aircraft; namely, the single engine type and the multiengine type. The multiengine type has the advantage that in the event of failure of one of the engines, the other engine will sustain the aircraft in flight. The single engine tpye aircraft has the disdavantage that if the single engine power plant should fail, the aircraft must descend in an emergency landing. The single engine type aircraft, however, has the advantage that it has center line thrust which results in ease of handling while in the multiengine aircraft, a serious unbalance occurs when one engine fails.

Various efforts have been made to combine two power plants in one aircraft engine but none of these have been completely successful.

In the present invention, the two power plants are integrated in a single crankcase while separate oil supplies, ignition systems, and other indispensible components are provided for each individual engine entity while secondary accessories such as generators, starters, vacuum pumps, and the like have not been provided in duplicate for each engine. This results in a saving of weight and simplicity of the engine.

It is, accordingly, an object of the present invention to provide an improved dual engine.

Another object of this invention is to provide an engine having two independent separately operating units therein.

Still another object of this invention is to provide a dual engine having separate oil supplies, separate ignition systems, and separate fuel supplies for each individual unit thereof.

A further object of the invention is to provide a dual engine in combination with an improved synchronizing means for two engines.

Yet a further object of the invention is to provide an improved engine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 4 is a longitudinal view of one half of the engine with the other half removed.

Figure 1:
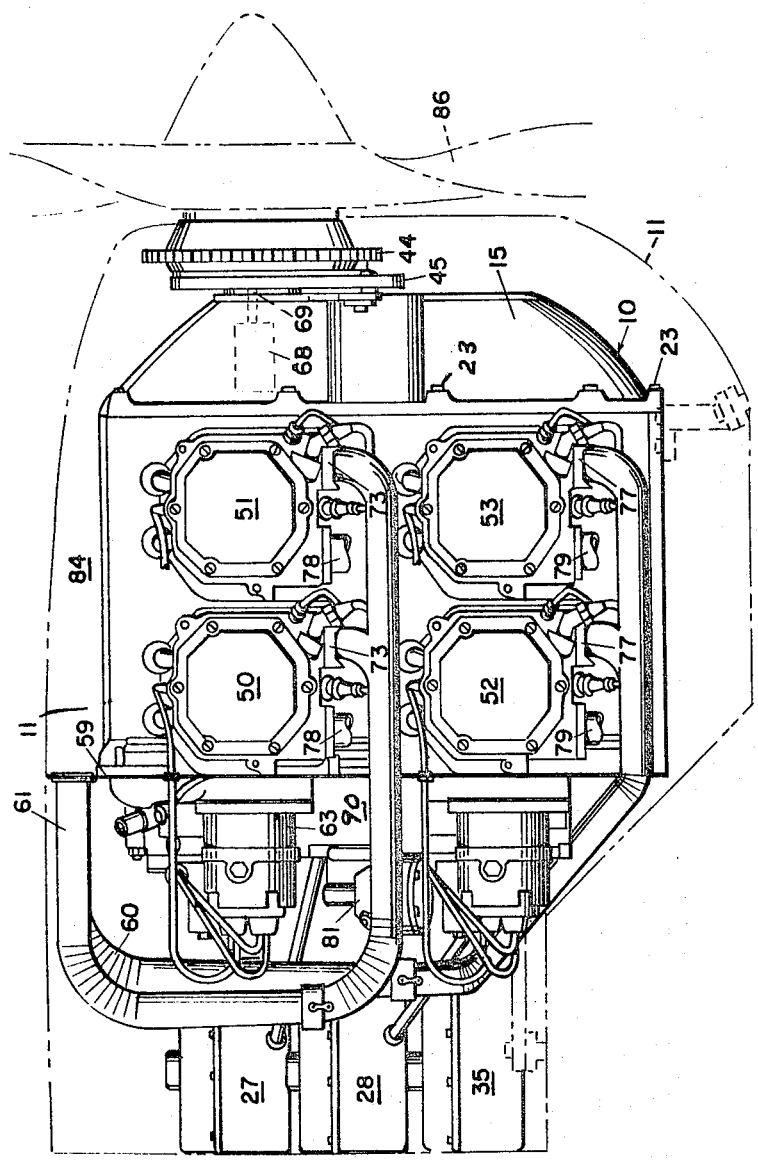
FIG. 1 is a side view of an engine according to the invention showing the aircraft cowling in phantom lines.

Now with more particular reference to the drawings, the engine 10 is shown in an aircraft cowling 11. The engine 10 is made up of a crankcase 12 having two halves 13 and 14 and a gear case 15. The crankcase 12 may be cast in a conventional manner and it has mating surfaces 16 which may be provided with bolts through holes 100 which hold the halves together and thereby seal them to provide an oil containing area.

The half 14 defines spaces 17 and 18 which enclose the crankshafts 19 and 20 and cam shafts 21 and 22. The gear case 15 is made in two halves bolted together to the front end of the crankcase 12 by means of bolts 23 which extend through the gear case 15 and attach it to the crankcase 12. The gear case provides a space 24 for oil around the gears and clutches 25 and 26. Thus, the spaces 17, 18, and 24 are each independent of each other and are provided with separate oil pumps which connect the oil to the separate containers 27, 28, and 35.

The clutches 25 and 26 could be any of the overrunning clutches of suitable design and familiar to those skilled in the art.

Main bearings 29 to 34 are provided in the crankcase to support the crankshaft and cam shaft bearings 87 to 92 are likewise provided in the crankcase.

The front end of the crankshaft 20 has the overrunning clutch 25 attached to it and the crankshaft 19 has the overrunning clutch 26 attached to it. The outer overrunning sections of clutches 25 and 26 have the gears 37 and 38, respectively, attached thereto. These gears are connected together through an idler gear 39. The idler gear 39 is supported on the crankshaft case 12 and on the gear case 15 by means of a shaft 40.

A propeller hub shaft 41 is connected to the overrunning part of clutch 26 by means of studs 42. These studs are also used to attach the gear 38 to the overrunning part.

A pulley 45 is fixed to the propeller hub shaft 41 and the pulley 45 drives the generator 46.

Figure 2:
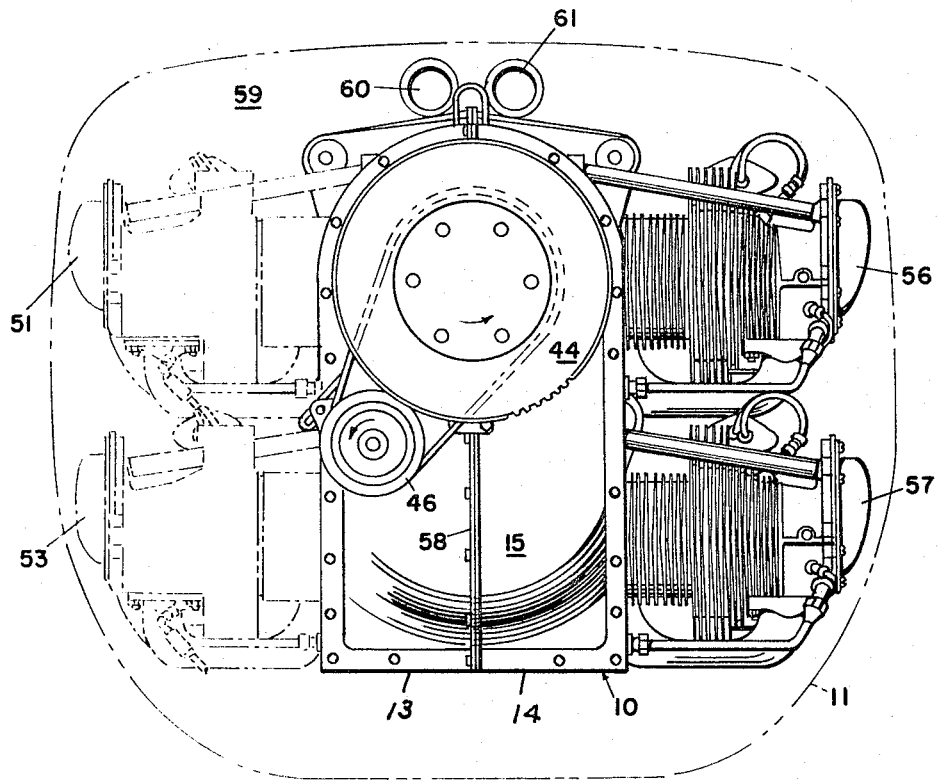
FIG. 2 is a front view of the engine shown in FIG. 1.
Figure 3:
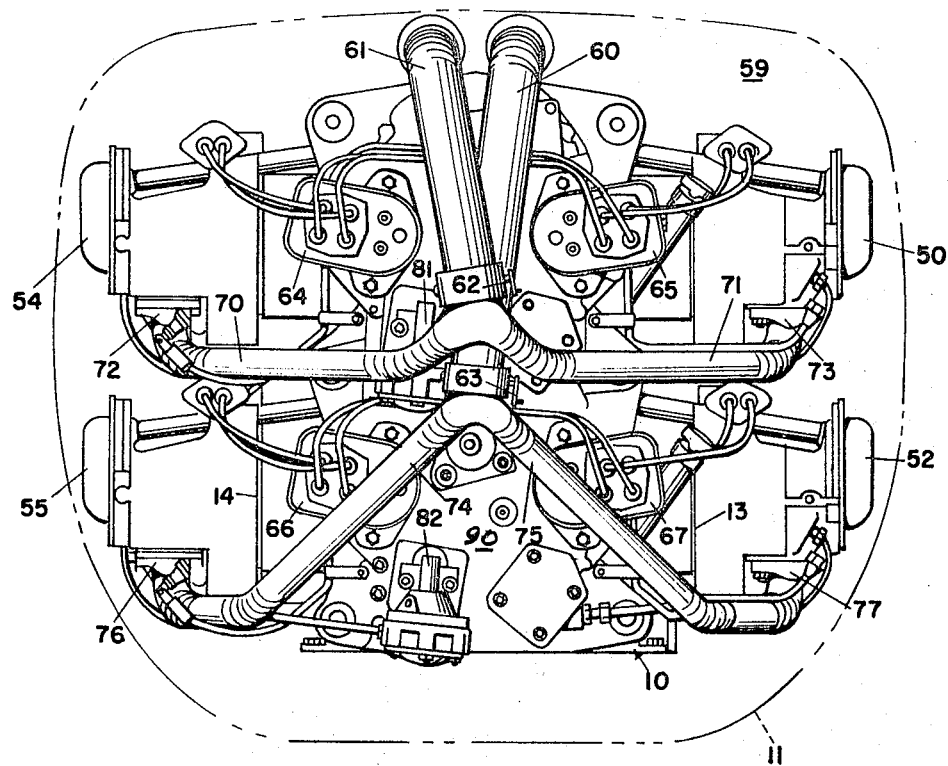
FIG. 3 is a rear view of the engine shown in FIG. 1.

Cylinders, 50, 51, 52, 53, 54, 55, 56, and 57 are shown which will be familiar to those skilled in the art. They are attached to the sides of the engine halves 13 and 14. It will be noted that the gear case 15 is made in two sections which are joined along the flanged surface 58 as shown in FIG. 2.

The engine is provided with a heat baffle 59 at the back which extends upwardly and engages the cowling 11. The induction system made up of ducts 60 and 61 is connected to the heat baffle 59 and receives air from the space 84 above the engine and directs it through the throttles 62 and 63 to the engine. The engine is provided with a conventional type of fuel injection system which admits gasoline individually to each cylinder.

The upper bank of cylinders is ignited by means of magnetos 64 and 65 in a dual ignition arrangement familiar to those skilled in the art. The lower bank of cylinders is ignited by magnetos 66 and 67. Thus, the upper cylinders are independent from the lower cylinders in that the induction systems and the ignition systems are provided separately for each bank of cylinders. The magnetos, fuel pumps, and other accessories are supported on accessory plate 90 which may be a single integral casting extending from top to bottom of the engine. It encloses the usual timing gears for each engine unit and supports the fuel pumps and magnetos.

A suitable propeller governor 68 may be driven by a gear engaging the hub of the propeller hub assembly at 69. It will be noted that the induction pipe 61 discharges into the two separate branches 70 and 71 which are connected to the cylinders at 72 and 73. The induction pipe 60 communicates with branches 74 and 75 which are, in turn, connected to the cylinders at 76 and 77. The exhaust escapes through a suitable exhaust system through ports 78 and 79.

It will be noted that the upper bank of cylinders, including cylinders 50, 51, 54, and 56, will receive their induction air through induction pipe 61 and throttle 62. They will be supplied fuel from a separate fuel supply which could be provided through a fuel pump 81. The lower cylinders can be provided with fuel through a fuel pump 82 and, as mentioned above, the lower cylinders will be ignited by magnetos 66 and 67 while the upper cylinders will be ignited by magnetos 64 and 65. Air for the induction pipes 60 and 61 will be received from the space 84 above the engine.

It will be noted that either the upper bank of cylinders or the lower bank can function independent of the other to drive the propeller 86 so that regardless of whether the oil supply, fuel supply, or other component of the upper cylinders fails, the engine can continue driving the propeller 86 through the other bank of cylinders.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An engine comprising
  a first crankshaft and a second crankshaft,
  said engine having a crankcase made of two separable halves,
  each said half having means to support a part of each of the main bearings for said crankshafts,
  and means to fix said two halves together whereby said crankshafts are supported by said main bearings, sealing means on said crankcase separating said crankshafts into separate sealed compartments, two oil supplies, one in each said compartment, a first and a second oil circulating means, means connected to a first half of said crankcase for operating said first oil circulating means, and means connecting said second oil circulating means to a second half of said crankcase.

2. The engine recited in claim 1 wherein
  said first and second oil circulating means comprise a first oil sump and a second oil sump,
  and a first oil pump connected to said first half of said crankcase,
  and a second oil pump connected to said second half of said crankcase.

3. The engine recited in claim 1 wherein
  a clutch means is provided on said engine connecting said first crankshaft to said second crankshaft,
  said crankcase has means thereon separating said crankshafts from said clutch means,
  and an oil circulating means independent of said first half of said crankcase and said second half of said crankcase for providing oil to said clutch means.

4. An engine comprising
  a crankcase made in two halves,
  said two halves having a mating surface defining an upper enclosure and a lower enclosure one above the other,
  the upper of said enclosures having a first crankshaft and a first cam shaft therein,
  the lower of said enclosures having a second crankshaft and a second cam shaft therein,
  a first oil pump and a first oil container connected to said upper enclosure,
  a second oil pump and a second oil container connected to said lower enclosure,
  a gear case in front of said crankcase,
  said gear case being made of two separate halves having a bearing supported therebetween,
  said gear case having means attaching it to said crankcase whereby a separate enclosure for gears is provided therein,
  and an oil system for said gears independent of said first and second oil pumps and containers.

5. An internal combustion engine comprising
  upper and lower crankcases integrally connected together,
  a gear case attached to the front of said crankcases,
  a first oil system for said upper crankcase,
  a second oil system for said lower crankcase independent of said upper crankcase,
  and a third oil system for said gear case,
  said first, second, and third oil systems being independent of each other.

6. The engine recited in claim 5 wherein
  said crankcases are made of two lateral crankcase castings disposed in side by side relation,
  said castings being bolted together,
  each said casting having means to support one half of at least one main bearing of a first crankshaft in said upper crankcase,
  each said casting having means to support at least one main bearing of a second crankshaft in said lower crankcase.

7. The engine recited in claim 6 wherein
  said gear case is made up of two gear case castings, each comprising one side and half of the front of said gear case,
  said gear case castings each having means to support one half of a propeller shaft bearing.

8. The engine recited in claim 6 wherein a single accessory plate is attached to and overlies an end of both said lateral crankshaft castings.

9. The engine recited in claim 8 wherein at least two magnetos are attached to said accessory plate.

References Cited

UNITED STATES PATENTS

| | | | |
|---|---|---|---|
| 2,371,872 | 3/1945 | Caldwell et al. | 170—135.7 |
| 2,470,155 | 5/1949 | Forsyth | 170—135.7 X |

FOREIGN PATENTS

| | | |
|---|---|---|
| 554,218 | 7/1932 | Germany. |
| 296,184 | 5/1932 | Italy. |

OTHER REFERENCES

"Nickel Steel Topics," October 1938, page 2, top half of page.

"Aviation News," March 19, 1945, page 23.

MARK NEWMAN, *Primary Examiner.*

WENDELL E. BURNS, *Examiner.*